United States Patent [19]
Anderson

[11] 3,801,082
[45] Apr. 2, 1974

[54] OXYGEN REFUSE CONVERTER
[75] Inventor: John Erling Anderson, Katonah, N.Y.
[73] Assignee: Union Carbide Corporation, New York, N.Y.
[22] Filed: Dec. 29, 1972
[21] Appl. No.: 319,530

[52] U.S. Cl. .............................................. 266/33 S
[51] Int. Cl. ............................................... F27b 1/10
[58] Field of Search ............ 266/24, 25, 33 R, 33 S, 266/42, 34 R

[56] References Cited
UNITED STATES PATENTS
3,122,421   2/1964   Gettle .................................. 266/38
3,429,361   2/1969   Brooks ................................ 164/57

Primary Examiner—Gerald A. Dost
Attorney, Agent, or Firm—Bernard Lieberman

[57] ABSTRACT

Apparatus for disposing of refuse by converting it to useful gaseous products and inert solid residue comprising a vertical double frusto-pyramidal metal shaft tapering towards progressively smaller cross-sectional areas at both the top and at the base, having vapor-tight inlet means for refuse and oxygen and outlet means for product gas and molten residue.

9 Claims, 2 Drawing Figures

PATENTED APR 2 1974          3,801,082

OXYGEN REFUSE CONVERTER

BACKGROUND

This invention relates to solid refuse disposal, and more particularly to a shaft furnace type converter capable of converting solid waste into useful gaseous products and inert solid residue.

Refuse disposal systems have received much attention in recent years as attempts have been made to produce useful or at least readily disposable residue materials from a wide range of refuse compositions. A process for the conversion of combustibles to a useful gaseous stream, and non-combustibles to molten metal and slag in a vertical shaft furnace by feeding solid waste at the top and oxygen or oxygen enriched air at the bottom is disclosed in my copending application, Ser. No. 161,107, filed July 9, 1971, the disclosure of which is incorporated herein by reference.

Conventional shaft-type furnaces are not suited for carrying out a waste conversion process such as described in my above-mentioned copending application. During normal operation of said waste conversion process, three operating zones are established along the length of the furnace, each of which differs markedly from the other with respect to operating temperature, mass throughput and composition of material streams. For example, in the combustion and melting zone (also referred to as the hearth) at the base of the furnace, the required temperature is above the melting point of glass and metal, generally about 3,000°F. Accordingly, a high heat transfer rate and a small cross-sectional area is necessary in the hearth. On the other hand, in the drying zone at the top of the furnace, the product gas should be discharged from the furnace at as low a temperature as possible, preferably about 200°F. The low temperature insures that only a minimal amount of energy is lost to the surroundings in the form of sensible heat. In addition, the velocity of the product gas leaving the furnace must be sufficiently low to prevent excessive entrainment of fly ash therein. Thus, a large cross-sectional area is required at the top of the furnace relative to that required at the base. However, a furnace having a decreasing cross-sectional area from top to bottom is undesirable because the descending refuse tends to bridge in a downwardly contracting tapering conical section. This problem, in an extreme case, may cause a complete shut-down of the furnace operation. Moreover, conventional shaft furnace design is such that its operating efficiency varies with the mass flow rate of the refuse. That is, the process efficiency at relatively low feed rates is substantially lower than at rated or design capacity. Consequently, it is not possible to achieve stable, long-term and efficient operation with prior art furnaces, particularly over the wide range of operating conditions normally encountered in conversion of solid waste material to useful gaseous combustion products.

Another requirement for a high temperature waste convertor is that it be able to tap molten metal and slag from the hearth continuously when operating under positive pressure; preferably, from a non-submerged taphole. In order to maintain a continuous flow of molten residue from the taphole it is necessary that the taphole be kept sufficiently hot to maintain the residue (comprising mainly metal and/or slag) in the hearth molten, and to permit the molten stream to flow from the hearth into the collection vessel without solidifying prematurely. Ordinarily, tapholes are kept open by directing the flames from a pre-mixed type oxy-fuel burner at the taphole. However, where the refuse converter operates under positive pressure, the taphole and the adjacent vessel into which the molten residue is discharged is preferably enclosed to prevent the taphole from communicating with the surrounding atmosphere, thus permitting the taphole to operate in the preferred non-submerged condition. Consequently, the burner operates in an oxygen-lean atmosphere (generally, below 5 percent oxygen) which together with the requirement of feeding an oxy-fuel mixture containing less than stoichiometric oxygen to the pre-mixed burner, severely limits the amount of heat available from the burner flame due to the relatively large amounts of uncombusted fuel therein.

The continuous tapping of molten metal and slag creates additional problems with regard to the taphole. For successful continuous tapping, it has been found useful to maintain a refractory pouring lip which extends outwardly from the bottom edge of the taphole, slightly beyond the furnace shell, so that the melt will not freeze onto the shell but instead will flow directly into a quench tank or mold. A convention refractory tap causes erosion of the pouring lip, with subsequent formation of an irregular "skull" or solidified layer of molten slag adhering to the furnace shell. Thus, the taphole and furnace hearth must be specifically designed to allow the molten residue to be discharged in a substantially continuous and efficient manner into an adjacent quench medium or mold.

OBJECTS

Accordingly, it is an object of this invention to provide a shaft furnace particularly suitable for use as a high temperature oxygen refuse converter. It is another object of this invention to provide a refuse converter capable of operating under pressure and of continuously discharging a relatively low temperature gas from the top section and a molten residue at the base section.

SUMMARY

These and other objects which will become apparent from the detailed disclosure and claims to follow are achieved by the present invention which comprises:

apparatus for disposing of refuse by converting it to useful gaseous products and inert solid residue comprising in combination:

1. a vertical double frusto-pyramidal metal shaft tapering towards progressively smaller cross-sectional areas at both the top and at the base thereof, said shaft providing a drying zone at the top section thereof, a hearth at the base section thereof, and a thermal decomposition zone between said drying zone and said hearth, wherein the cross-sectional area at the base of the hearth is equal to or less than the value given by the formula:

$$A = R/8$$

wherein:

$A$ = cross-sectional area at base of hearth (ft$^2$) and
$R$ = refuse feed rate (tons/day), 2. means for feeding an oxygen-containing gas into said hearth, 3. vapor-tight means for feeding refuse into the top section of said shaft to form a refuse bed therein, the cross-sectional area of said shaft at the level of the top surface of said refuse bed being at least equal to the value defined by the formula: $B = R [0.17 + 0.023 (100-P)/(P)]$
where:
$B$ = cross-sectional area (ft$^2$),
$P$ = percent oxygen in said oxygen-containing gas, and
$R$ = refuse feed rate (tons/day), 4. conduit means communicating with the top section of said shaft for discharging the gaseous products formed, 5. a taphole communicating with said hearth for discharging molten residue therefrom, said taphole having a cross-sectional area greater than that defined by the formula:
$C = 0.0035 RX$
where:
$C$ = cross-sectional area of the tap (in$^2$),
$R$ = refuse feed rate (tons/day), and
$X$ = percentage of metal, glass, ash and the like high melting materials in the refuse (%),
said taphole being provided with a pouring lip extending outwardly from the bottom edge of said taphole to guide the flow of molten residue discharged therefrom into 6. receptacle means for containing the discharged molten residue and for permitting same to solidify into a solid residue, and 7. means for removing said solidified residue from said receptacle means.

In a preferred embodiment of the present invention, the refuse converter includes means for operating the shaft furnace under positive pressure relative to ambient pressure, with the taphole operating in a non-submerged condition; namely, with only a portion of the cross-sectional area of the taphole opening being below the surface of the molten residue in the hearth. In accordance with this embodiment, a tapping chamber is provided for maintaining a continuous flow of molten residue from said taphole comprising: (a) a vapor tight enclosure surrounding the opening of said taphole to prevent said taphole from communicating with the surrounding atmosphere, (b) means for cooling said pouring lip, whereby the initial discharge of molten residue from the taphole forms a solidified protective layer along the wetted surface of said pouring lip, (c) pre-mixed type burner means adapted to burn a fuel-oxygen mixture for heating said taphole, disposed within said enclosure so as to direct the burner flame upon the opening of said taphole, and (d) auxiliary oxygen-containing gas discharge means positioned proximate to the burner such that at least a portion of the discharged oxygen-containing gas becomes mixed with the burner flame.

The term "pre-mixed burner" as used herein refers to any conventional burner wherein the fuel gas composition is pre-mixed with the oxidant gas within the burner prior to ignition. This is in contrast to direct or post-mixed burners wherein the fuel and oxidant gas are mixed outside the burner at the point of ignition.

The term "residue" as used herein refers to metal, slag or mixtures thereof. The slag results from the inorganic portions of the refuse which are not ordinarily combustible, and is formed predominantly of materials such as glass and cementitious materials.

The term "pyramidal" is used herein in its generic geometrical sense to mean a three dimensional figure having for its base a polygon and for its sides a plurality of triangles forming the sides of the base of the pyramid. Although the most common form of pyramid has a rectangular base, in the limiting case, the pyramid may have for its base an infinitely sided polygon, i.e. a circle, thereby defining a cone. Hence, a cone is a species of pyramid.

The term "tons/day" as used herein refers to a 24 hour operating day.

DRAWINGS

DETAILED DESCRIPTION

Figure 1:
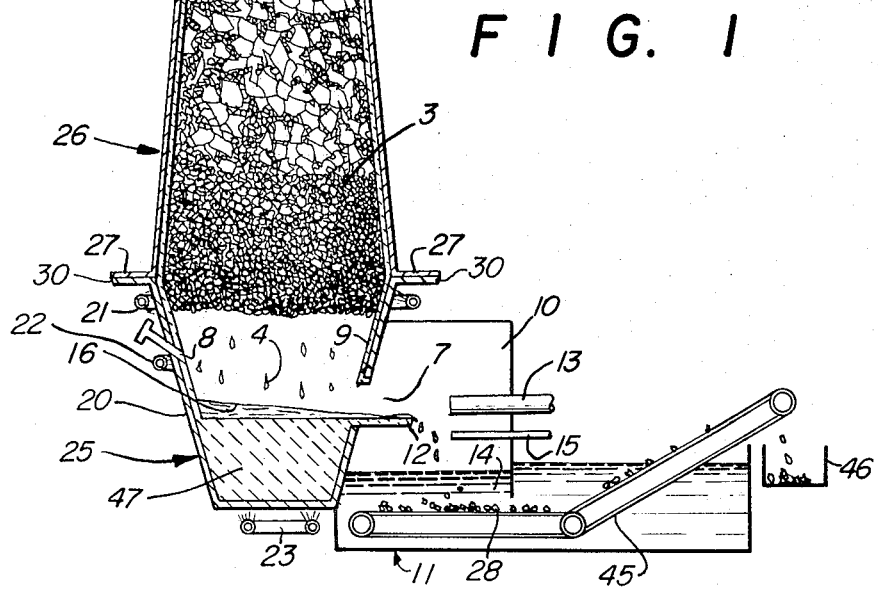
FIG. 1 is a schematic illustration in partial cross-section, of a preferred refuse converter embodying the invention.

Referring to FIG. 1, there is shown a shaft furnace 1, containing a drying zone 2 in the top section 50 of the shaft, a combustion and melting zone (commonly referred to as the hearth 4) in the base section of the shaft and a thermal decomposition zone 3 located between the drying zone 2 and the hearth 4. It should, of course, be understood that the above described operating zone do not exist as rigidly defined zones in the shaft furnace, but rather, overlap to a limited extent. Thus, for example, while drying of the incoming refuse occurs almost entirely within the drying zone 2, nevertheless, some particles of refuse are only partially dried in drying zone 2 and dried to completion in the thermal decomposition zone 3. Conversely, even though pyrolysis of the refuse occurs almost entirely in the thermal decomposition zone 3, some particles of refuse are thermally decomposed in passing through the drying zone 2. The furnace 1 has a double frusto-pyramidal shape with the widest portion or greatest cross-sectional area in the thermal decomposition zone 3, and tapering inwardly towards both the top and base of the shaft. Shaft furnace 1 is preferably constructed of a refractory-lined metallic shell 20 with the hearth 4, in particular, being lined with a high quality refractory 9 to conserve heat, withstand the high temperature in the hearth and maintain uniform temperature therein; the hearth 4 being generally maintained at a temperature of around 3,000°F. To insure long refractory life, the shell 20 surrounding the bottom portion of hearth 4 is cooled in order to minimize wear of the refractory lining 9 due to the high temperature and severe corrosive conditions present in hearth 4. A spray of cooling liquid is provided by metal pipe rings 21, 22 and 23 which are shaped to conform to the contour of shell 20 surrounding hearth 4 and are supported from said hearth shell. A liquid coolant, such as water is supplied under pressure to pipe rings 21, 22 and 23 which contain suitably sized drillings therein so as to create a spray pattern of cooling liquid impinging upon the shell 20. When the shell 20 is sufficiently cooled, a protective skull (not shown) of solidified molten slag is formed along the inner refractory surface 9 of hearth 4 thereby protecting said refractory from further erosion. For ease of furnace maintenance and repair, the bottom portion 25 of furnace 1 is removably attached to the upper portion 26 by bolted flanges 27 and 30. A gasket (not shown) may be used between the metal flanges 27 and 30 to insure a tight seal between said upper and lower furnace sections 26 and 25.

Shaft furnace 1 is provided with a product gas discharge port 6, an oxidant gas inlet tuyere 8 in the hearth 4 and a slag taphole 7 communicating with tapping chamber 10. Tuyere 8 is preferably one of at least four water-cooled oxygen tuyeres symmetrically located around the hearth 4; tuyere 8 being the only one shown in the drawing. For most effective operation, the tuyeres are positioned at an angle relative to the horizontal such that the discharged oxidant gas is directed towards the center of the molten pool 16 of residue. Also, the tuyeres are maintained at a sufficient height above the molten residue 16 to prevent molten metal and/or slag from entering the tuyere assembly and reacting with the oxidant gas. For purposes of cooling, tuyere 8 is most conveniently comprised of an assembly of two co-axially aligned tubes (not shown) wherein oxygen is fed to the center tube and cooling water is circulated through the annular chamber formed between the tubes thereby cooling the oxygen tuyere and prolonging its operating life.

The tapping chamber 10 is comprised of a vapor tight enclosure 11, refractory pouring lip 12 comprising a refractory bar extending outward from taphole 7 slightly beyond the hearth shell 20, and pre-mixed burner 13. Enclosure 11 provides a pressure-tight seal for taphole 7 in order to allow shaft furnace 1 to operate at a positive pressure relative to the ambient pressure without having to conically maintain the taphole 7 in a submerged condition. Thus, the primary function of enclosure 11 is to prevent the gases to furnace 1 from communicating with the surrounding atmosphere. Although, in ordinary practice this may be accomplished with a submerged taphole, for ease of furnace operation, specifically, to facilitate the continuous discharge of molten residue, it is preferred that the liquid level of molten residue 16 be kept below the opening of taphole 7, as shown in FIG. 1. Enclosure 11 also serves as the containing receptacle for quench water 14. Burner 13 and auxiliary oxygen discharge pipe 15 protrude into enclosure 11, with burner 13 being directed at the opening of taphole 7. Discharge pipe 15 is positioned proximate to burner 13 such that at least a portion of an oxygen containing gas discharged from the pipe 15 becomes mixed with the burner flame and oxidizes at least a portion of the uncombusted fuel in said flame. Apron conveyor 45 is so disposed beneath the surface of quench water 14 as to transport the particles of solidified residue 28, as they are formed, to receiving container 46. For purposes of the drawing, conveyor belt 45 is shown in side view, rotated 90 degrees from its intended operating alignment to more clearly illustrate its mode of operation. Tapping chamber 10 is also provided with a suitable vent (not shown) to allow the escape of gas from enclosure 11 when the pressure in hearth 4 exceeds a predetermined limit, generally about 30 inches of water.

A refuse feed hopper (not shown), communicating through slide gate 18 with feed chute 17, is fixedly attached to the top of shaft furnace 1. A second slide gate 19 is used in combination with slide gate 18 to maintain the reactor 1 sealed while refuse R is being fed. Purge line 24, communicating with chute 17 below slide gate 18, is used to purge chute 17 with steam S, or alternatively with an inert gas such as argon, to prevent the escape of small quantities of product gas G into the atmosphere when gate 18 is opened to receive additional refuse. One skilled in the art will, of course, appreciate that other feed devices capable of maintaining a pressure tight seal while feeding solid material may also be used.

In operation, refuse R is fed into furnace 1 through slide gates 18 and 19 which cooperate to seal the shaft during feeding to maintain positive pressure therein. This is accomplished by opening gate 18 while maintaining gate 19 in a closed position, permitting the refuse R to drop into chute 17. Thereafter, the positions of gates 18 and 19 are reversed, such that gate 18 is first closed and gate 19 then opened, permitting the refuse R in chute 17 to drop into furnace 1. Steam S is then injected through purge line 24 into chute 17 so as to purge chute 17 free of all product gas G before the gate positions are, once again, reversed, namely, before closing gate 19 and opening gate 18. This is to insure that all product gas G leaves furnace 1 through discharge port 6. Upon leaving gate 19 refuse R drops into drying zone 2 forming a refuse bed therein having its top surface 5 beneath the gas discharge port 6. The downwardly expanding taper of the top portion of the furnace reduces bridging of the refuse as it passes from the drying zone 2 to the thermal decomposition zone 3 wherein the organic combustible material is decomposed primarily to carbon monoxide, hydrogen and water vapor, and the non-combustibles form char, which is primarily carbon. Metal, cementitious materials, glass and like non-combustibles together with the char proceed further down the shaft furnace into the hearth 4 wherein the char reacts exothermically with the oxygen gas entering through tuyere 8 to provide a molten pool 16 of metal and slag upon refractory block 47 at the base of hearth 4. The molten pool 16 is discharged through taphole 7 and overflows pouring lip 12, falling down into quench water 14 wherein the metal and slag solidify in granular form forming discrete particles of residue 28 which settle to the bottom of chamber 11 upon conveyor belt 45 and are then transported in continuous fashion to receiving container 46. Burner 13 is directed at taphole 7 so as to maintain the molten residue sufficiently fluid in taphole 7 and on pouring lip 12 for continuous tapping.

Figure 2:
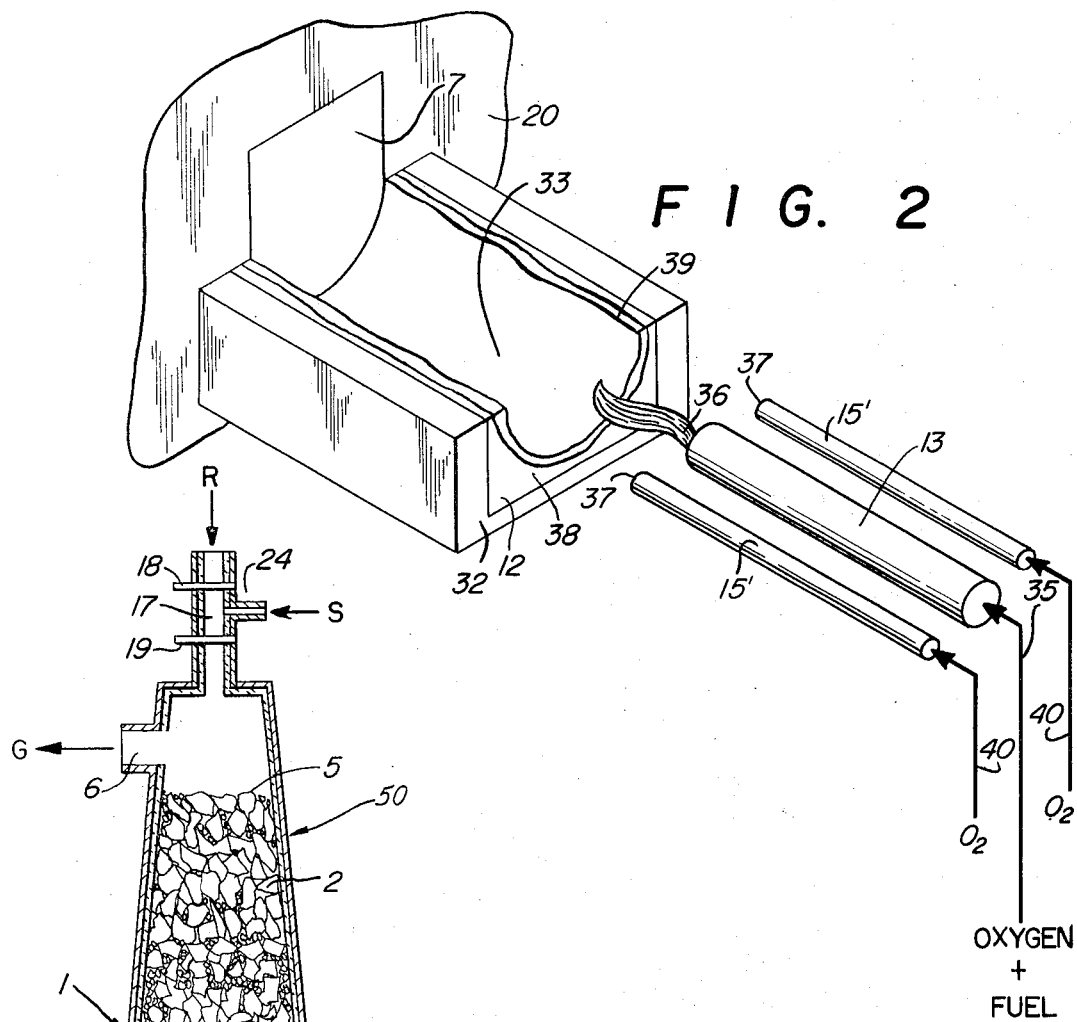
FIG. 2 is a schematic drawing, in perspective, illustrating the invention, and in particular, the relative orientation of the taphole and related tapping apparatus within the tapping chamber.

Referring to FIGS. 1 and 2, pouring lip 12 is shown as a trough-shaped refractory bar extending outward from the bottom edge of taphole 7 to guide the flow of molten metal and slag discharged therefrom into a quench tank or alternatively a mold (not shown). To operate effectively as a precipice over which the molten residue can flow, pouring lip 12 preferably extends at least two inches into tapping chamber 10. To prevent erosion of pouring lip 12 and the subsequent formation of an irregular skull adhering to the furnace shell, cooling jacket 32 comprising a metal slab having passageways therethrough for circulating a liquid coolant, such as water, is positioned underneath pouring lip 12, flush with the furnace shell 20 so as to contact the outer non-wetted surfaces of pouring lip 12. In so doing, the wetted surface 33 of pouring lip 12 is sufficiently cooled so that a skull 39, or solidified layer of molten slag, will form on wetted surface 33 to protect pouring lip 12 from further wear. Thus, the primary function of cooling jacket 32 is to maintain the discharge end 38 of pouring lip 12 at a fixed distance from the furnace shell.

Cooling jacket 32 is most conveniently comprised of a water-cooled metal slab, such as copper, although, obviously numerous alternative cooling arrangements may be used with equal effectiveness. Generally, the temperature of the cooling surface in contact with the pouring lip should be below 500°F. The thickness of the refractory pouring lip, under continuous operation, will be determined by the temperature of the cooling jacket and the flow rate of molten metal and slag discharged from the taphole.

A fuel-oxidant mixture (indicated by arrow 35) is shown being fed to pre-mixed burner 13 which is directed at the discharge end 38 of pouring lip 12 and taphole 7. Oxygen discharge tubes 15', are positioned parallel to the axis of burner 13 and apart therefrom such that a portion of the oxygen-containing gas 40 discharged from the discharge ports 37 will be aspirated into the flame 36 thereby increasing its temperature and producing a corresponding increase in the rate of heat transfer into taphole 7. For efficient operation, the distance between the discharge end of the burner and the taphole must be less than 20 times the nozzle diameter of the burner.

It will be appreciated by one skilled in the art that the proximate location of the auxiliary oxygen-containing gas discharge means relative to the burner can vary widely depending on the manner in which mixing is accomplished. For example, the oxygen-containing gas can be aspirated into the burner flame by being directed coaxially with said flame, but separate therefrom as a so-called "shroud gas" surrounding the flame. This can be readily accomplished, for example, in a conventional burner having at least two internal tubes in concentric axially aligned relationship by feeding the oxy-fuel mixture through the center tube and the oxygen containing gas through the annular passage. As shown in FIG. 2, the same annular shroud effect can be achieved in a single barrel burner, by positioning a plurality of oxygen-containing gas discharge tubes parallel to the axis of the flame and apart therefrom along the sides of the burner. In either case, the flame temperature will be increased as shroud oxygen is aspirated into the mixture discharged from the burner. Alternatively, the oxidant discharge means can be positioned as an "undershot" stream of oxygen-containing gas which directly impinges upon the burner flame to raise its temperature. Thus, the term "proximate to", as used throughout the disclosure and claims, contemplates positioning the auxiliary oxidant discharge means so that the discharged oxygen-containing gas directly contacts the flame (e.g. undershot oxygen) as well as indirect contact between the streams (e.g. aspiration of oxygen into the flame). For a more detailed description of the process for preventing solidification in the taphole, reference is made to my copending application Ser. No. 319,529, filed of even date herewith.

A structural relationship which is necessary for achievement of the objectives of the present invention is that the cross-sectional area of the taphole be greater than the value defined by the following formula:

$C = 0.0035 \, RX$ where:

$C$ = cross-sectional area of the taphole (in$^2$),
$R$ = refuse feed rate (tons/day) and
$X$ = percentage of metal, glass, slag and like high melting inorganic materials in the refuse (%).

The upper operating limit for the taphole opening is that its cross-sectional area be no greater than the value:

$C = 2.4R$ where:

$C$ and $R$ are as defined above.

The double frusto-pyramidal shape of the furnace and the cross-sectional areas at the base and the top surface of the refuse bed are other essential features of the invention. By providing an outward taper from the top section of the furnace toward the middle, "bridging" of the refuse descending through the furnace is minimized. In addition, the cross-sectional area of the furnace section corresponding to the upper surface of the refuse bed must be equal to or greater than the value defined by the formula: $B = R \, [0.17 + 0.023 \, (100-P)/(P)]$ where:

$B$ = cross-sectional area (ft$^2$),
$P$ = percent oxygen in said oxygen-containing gas (%), and
$R$ = refuse feed rate (tons/day).

In so doing, the velocity of the product gas leaving the drying zone is made sufficiently small, thereby minimizing the amount of fly ash which becomes entrained therein. As a result, the subsequent gas cleaning operation is greatly simplified.

The upper operating limit for the furnace cross-sectional area corresponding to the upper surface of the refuse bed is that its value be no greater than defined by the formula:

$B = 10R \, ]0.17 + 0.023 \, (100-P)/(P)]$ where:

$B$, $R$ and $P$ are as defined above.

The inward taper toward the bottom section of the furnace is to insure a high heat transfer rate throughout the hearth by minimizing the volume of the furnace in which the combustion reaction and melting of the inorganic solids occur. This is accomplished by designing the furnace hearth so that its maximum cross-sectional area at the base of the hearth will be that defined by the following formula:

$A = R/8$ where:

$A$ = cross-sectional area at base of hearth (ft$^2$) and $R$ = refuse feed rate (tons/day).

The energy released per unit of furnace volume is thereby kept very large. Consequently, the temperature throughout the hearth is uniform and substantially above the melting point of glass and metal.

The lower operating limit for the base of the hearth is that its cross-sectional area be equal to or greater than that defined by the following formula:

$A = R/100$ where:

$A$ and $R$ are as defined above.

The provision of a tapping chamber is a preferred feature of the present invention. It enables molten metal and slag to be continuously and safely tapped from the hearth which operates at a positive pressure, generally, about 10 inches of water. Erosion of the pouring lip and the concommitant formation of an irregular skull adhering to the furnace shell is avoided by providing cooling means for said pouring lip. The wetted surface of the pouring lip is sufficiently cooled so as to maintain a fixed distance between the discharge end of the lip and the furnace shell thereby preventing molten residue from solidifying on the furnace shell.

The increased tap temperature in the hearth, enabling the continuous tapping of molten residue, is provided by the burner means in the tapping chamber. Specifically, the pre-mixed burner in conjunction with a jet of oxygen-containing gas prevents the freezing of molten metal and/or slag at the pouring lip and within the taphole. In operation, the burner, when used without the auxiliary oxidant gas, has its maximum heat transfer intensity near the burner nozzle at the flame front. At the pouring lip and within the tap, the heat transfer rate is greatly reduced. However, the use of an auxiliary jet of oxygen-containing gas increases the rate of heat transfer to the point where the residue is kept molten within the hearth and pouring lip. This is the result of a two-fold effect. First, the addition of at least a stoichiometric amount of oxygen relative to the uncombusted fuel in the flame results in further combustion taking place in the flame and hence an increase in the amount of heat produced. Second, the presence of auxiliary oxygen in the burner combustion stream changes its character from a reducing to an oxidizing mixture, resulting in an exothermic reaction taking place in the hearth near the tap. Specifically, oxygen in the gaseous mixture reacts exothermically with the carbon in the heart to form CO or $CO_2$ thereby heating the molten bath and lowering its viscosity.

The refuse converter described herein is capable of converting, in an efficient manner, a wide variety of compositional matter into useful fuel gases and inert solid residues. Among the waste material capable of being so converted are combustible materials, such as paper, plastic, rubber, wood, food waste, sewage sludge and the like, and normally non-combustible materials such as metal, glass and fusible cementitious materials. Hence, the apparatus of the present invention may be used to dispose a residential, commerical, industrial as well as agricultural waste material.

What is claimed is:

1. Apparatus for disposing of refuse by converting it to useful gaseous products and inert solid residue comprising in combination:
   1. a vertical double frusto-pyramidal metal shaft tapering towards progressively smaller cross-sectional areas at both the top and at the base thereof, said shaft providing a drying zone at the top section thereof, a hearth at the base section thereof, and a thermal decomposition zone between said drying zone and said hearth, wherein the cross-sectional area at the base of the hearth is equal to or less than the value given by the formula:

$A = R/8$ where:
   $A$ = cross-sectional area at base of hearth (ft²) and
   $R$ = refuse feed rate (tons/day), 2. means for feeding an oxygen-containing gas into said hearth,
   3. vapor-tight means for feeding refuse into the top section of said shaft to form a refuse bed therein, the cross-sectional area of said shaft at the level of the top surface of said refuse bed being at least equal to the value defined by the formula:

$B = R [0.17 + 0.023 (100-P)/(p)]$ where:
   $B$ = cross-sectional area (ft²),
   $P$ = percent oxygen in said oxygen-containing gas, and
   $R$ = refuse feed rate (tons/day), 4. conduit means communicating with the top section of said shaft for discharging the gaseous products formed,
   5. a taphole communicating with said hearth for discharging molten residue therefrom, said taphole having a cross-sectional area greater than that defined by the formula:

$C = 0.0035 RX$ where:
   $C$ = cross-sectional area of the tap (in²),
   $R$ = refuse feed rate (tons/day), and
   $X$ = percentage of metal, glass, ash and like high melting materials in the refuse (%), said taphole being provided with a pouring lip extending outwardly from the bottom edge of said taphole to guide the flow of molten residue discharged therefrom into 6. receptacle means for containing the discharged molten residue and for permitting same to solidify into a solid residue, and
   7. means for removing said solidified residue from said receptacle means.

2. The refuse converter of claim 1 wherein the cross-sectional area at the base of the hearth is greater than the value given by the formula:

$A = R/100$ where:
$A$ = cross-sectional area at base of hearth (ft²) and
$R$ = refuse feed rate (tons/day).

3. The refuse converter of claim 1 wherein the cross-sectional area of said shaft at the level of the top surface of said refuse bed is no greater than the value defined by the formula:

$B = 10R [0.17 + 0.023 (100-P)/(P)]$ where:
$B$ = cross-sectional area (ft²),
$P$ = percent oxygen in said oxygen-containing gas, and
$R$ = refuse feed rate (tons/day).

4. The refuse converter of claim 1 wherein said taphole has a cross-sectional area no greater than the value defined by the formula:

$C = 2.4R$ where:
$C$ = cross-sectional area of the tap (in²), and
$R$ = refuse feed rate (tons/day).

5. Apparatus for disposing of refuse by converting it to useful gaseous products and inert solid residue comprising in combination:
   1. a vertical double frusto-pyramidal metal shaft tapering towards progressively smaller cross-sectional areas at both the top and at the base thereof, said shaft providing a drying zone at the top section thereof, a hearth at the base section thereof, and a thermal decomposition zone between the drying zone and said hearth, wherein the cross-sectional area at the base of the hearth is equal to or less than the value given by the formula:

$A = R/8$ and greater than the value given by the formula:

$A = R/100$ where:

$A$ = cross-sectional area at base of hearth (ft$^2$) and
$R$ = refuse feed rate (tons/day), 2. means for feeding an oxygen-containing gas into said hearth,
3. vapor-tight means for feeding refuse into the top section of said shaft to form a refuse bed therein, the cross-sectional area of said shaft at the level of the top surface of said refuse bed being at least equal to the value defined by the formula:

$B = R [0.17 + 0.023 (100-P)/(P)]$ and no greater than the value defined by the formula:

$B = 10R ]0.17 + 0.023 (100-P)/(P)]$ where:

$B$ = cross-sectional area (ft$^2$),
$P$ = percent oxygen in said oxygen-containing gas, and
$R$ = refuse feed rate (tons/day), 4. conduit means communicating with the top section of said shaft for discharging the gaseous products formed,
5. a taphole communicating with said hearth for discharging molten residue therefrom, said taphole having a cross-sectional area greater than that defined by the formula:

$C = 0.0035 RX$ and no greater than the value defined by the formula:

$C = 2.4R$ where:

$C$ = cross-sectional area of the tap (in$^2$),
$R$ = refuse feed rate (tons/day), and
$X$ = percentage of metal, glass, ash and like high melting materials in the refuse (%), said taphole being provided with a pouring lip extending outwardly from the bottom edge of said taphole to guide the flow of molten residue discharged therefrom into 6. receptacle means for containing the discharged molten residue and for permitting same to solidify into a solid residue, and
7. means for removing said solified residue from said receptacle means.

6. The refuse converter of claim 1 further including a tapping chamber for maintaining a continuous flow of molten residue from said taphole comprising: (a) a vapor tight enclosure surrounding the opening of said taphole to prevent said taphole from communicating with the surrounding atmosphere, (b) means for cooling said pouring lip, whereby the initial discharge of molten residue from the taphole forms a solidified protective layer along the wetted surface of said pouring lip, (c) pre-mixed type burner means adapted to burn a fuel-oxygen mixture for heating said taphole, disposed within said enclosure so as to direct the burner flame upon the opening of said taphole, and (d) auxiliary oxygen-containing gas discharge means positioned proximate to the burner such that at least a portion of the discharged oxygen-containing gas becomes mixed with the burner flame.

7. The refuse converter of claim 6 wherein said burner means comprises a pre-mixed type burner containing an inner tube for combusting a fuel-oxygen mixture concentrically aligned with an outer tube to define an annular passage therebetween for conducting an oxygen-containing gas such that at least a portion of the oxygen-containing gas discharged from the annulus becomes mixed with the flame.

8. The refuse converter of claim 6 wherein the distance between the discharge end of the burner and the taphole is less than 20 times the nozzle diameter of the burner.

9. The refuse converter of claim 1 further including means for cooling the metal shaft portion surrounding the hearth.

* * * * *